(12) United States Patent
Nolan

(10) Patent No.: US 7,533,733 B2
(45) Date of Patent: May 19, 2009

(54) METHOD AND APPARATUS FOR TREATING HOOF PROBLEMS

(76) Inventor: Michael E. Nolan, 2101 Coleman Dr., Columbus, OH (US) 43235

( * ) Notice: Subject to any disclaimer, the term of this patent is extended or adjusted under 35 U.S.C. 154(b) by 262 days.

(21) Appl. No.: 11/143,213

(22) Filed: Jun. 2, 2005

(65) Prior Publication Data

US 2006/0027379 A1 Feb. 9, 2006

Related U.S. Application Data

(60) Provisional application No. 60/577,134, filed on Jun. 4, 2004.

(51) Int. Cl.
*A01L 15/00* (2006.01)
*A01L 11/00* (2006.01)
*A61D 1/00* (2006.01)

(52) U.S. Cl. .............. 168/45; 168/2; 606/212

(58) Field of Classification Search .......... 168/1, 168/23, 2, 4, 27, 48.1, 45; 54/82; 119/856, 119/850; 606/212, 213
See application file for complete search history.

(56) References Cited

U.S. PATENT DOCUMENTS

| 230,155 | A | * | 7/1880 | Spence | 54/82 |
|---|---|---|---|---|---|
| 3,118,449 | A | * | 1/1964 | Bane | 606/212 |
| 3,682,179 | A | * | 8/1972 | Firth et al. | 606/212 |
| 3,738,427 | A | * | 6/1973 | Fryrear et al. | 168/4 |
| 3,961,668 | A | * | 6/1976 | Sirles | 168/4 |
| 4,422,509 | A | | 12/1983 | Mercer, II | 168/4 |
| 4,794,991 | A | | 1/1989 | Honderich | 168/26 |
| 4,896,727 | A | * | 1/1990 | Busser | 168/4 |
| 4,935,018 | A | * | 6/1990 | Scholz | 604/306 |
| 4,982,797 | A | * | 1/1991 | Monticello | 168/4 |
| 5,174,382 | A | | 12/1992 | Wright | 168/28 |

(Continued)

FOREIGN PATENT DOCUMENTS

AU 2001276635 A1 * 3/2003

(Continued)

OTHER PUBLICATIONS

English abstract of Dallmer DE10228728A1.*

*Primary Examiner*—Son T. Nguyen
(74) *Attorney, Agent, or Firm*—Ronald J. Koch

(57) ABSTRACT

A hoof plate is provided which is applied to a hoofed animal having a hoof problem, such as laminitis which is characterized by a degeneration of the horny and sensitive laminae in the hoof that causes the coffin bone to drop and rotate, resulting in pain and debilitation of the animal. Other problems treated are split, cracked, shelly and splayed hoofs, and thin hoof walls. The plate is flexible metal plate having a plurality of spaced apertures. If the horse is to be treated shod, a shoe is applied and nails are driven through the hoof wall and the plate apertures and clinched against the plate. Screws are then applied to immovable secure the plate to the hoof. If unshod treatment is used, the plate is just screwed to the hoof. Outward hoof growth is restrained for a period of 8-16 weeks, during which oxygenated blood flow is stimulated to the circumflex artery in the hoof capsule, resulting in laminae regeneration, and growth in the hoof wall, frog, heels and sole. The effects coffin bone re-rotation (where dropped in laminitis) and enables the animal to walk more normally.

4 Claims, 17 Drawing Sheets

U.S. PATENT DOCUMENTS

| | | | | |
|---|---|---|---|---|
| 5,176,221 A | * | 1/1993 | Aprill | 168/18 |
| 5,343,957 A | * | 9/1994 | Chapman | 168/11 |
| 5,626,610 A | * | 5/1997 | Janke | 606/212 |
| 5,638,905 A | * | 6/1997 | Sigafoos et al. | 168/17 |
| 6,122,901 A | * | 9/2000 | Schultz et al. | 54/82 |
| 6,283,219 B1 | | 9/2001 | Fryer | 168/26 |
| 6,571,881 B1 | | 6/2003 | Nolan | 168/20 |

FOREIGN PATENT DOCUMENTS

| | | | |
|---|---|---|---|
| DE | 19800695 A1 | * | 6/1998 |
| DE | 10228728 A1 | * | 11/2003 |
| EP | 1205107 A1 | * | 5/2002 |

* cited by examiner

METHOD AND APPARATUS FOR TREATING HOOF PROBLEMS

RELATED APPLICATION

This application claims priority of Provisional Patent Application, Ser. No. 60/577,134, dated Jun. 4, 2004.

TECHNICAL FIELD

This invention relates to a method and apparatus for treating hoof problems in equine and bovine animals.

BACKGROUND OF THE INVENTION

Many domestic four-legged animals are supported by hoofs that are attached at the ends of their feet. These animals include equines, such as draught, show and pleasure horses, ponies and mules, and cloven-hoofed bovines, such as cows and oxen. In a horse, for example, each foot terminates in the distal, or third, phalanx bone, also referenced simply as the "phalanx", "P-3", or "coffin" bone. This coffin bone is encased by a horny material called the hoof, which is attached via hundreds of laminae (or lamellae) to hundreds of sensitive laminae attached to the coffin bone. This provides a suspension for the foot and serves as a shock-absorber as the horse impacts the ground with its feet when it ambulates by walking, trotting, galloping or jumping.

The hoof wall of the horse continually grows to replace the material lost due to wear and tear at the ground surface, through cell proliferation at the coronet, where mitosis of the epidermal basal cells produces new generations of cells that mature and cornify to add incrementally to the length of the hoof wall. The exact nature of how the inner hoof wall laminae remain attached to the sensitive laminae of the stationary coffin bone, while one move over the other, is as yet unknown, although several theories exist.

Many horses and other animals are regularly shod, usually with steel and aluminum shoes, to protect the animal's hoofs. These shoes last an average of six to eight weeks, and then the animal must be re-shod. The reason for the relatively short life of a shoeing is that the hoof grows continually, and spreads as it grows, so the nails which secure the shoe to the animal are clinched against the relatively soft outside of the animal's hoof wall, and are pulled partially or fully through the hoof wall, thus loosening the shoe as the hoof grows.

Loosening of the shoeing nails is also caused by lateral or wedging forces imposed on the shod hoof by walking on uneven ground and by such activities as cutting, reining, roping, barrel racing, jumping and landing after a jump. All of these actions cause the shoeing nails to work lose and eventually lead to a thrown shoe. This causes the frequent re-shoeing that is all too common and expensive. To reduce this number of shoeings necessary, the inventor here developed a hoof plate that is the subject of U.S. Pat. No. 6,571,881, which in incorporated herein in its entirely by reference. The hoof plate is partially wrapped around the hoof and serves as an anvil against which the ends of shoeing nails are clinched. This holds the shoe in place much more securely than heretofore possible.

Because it is the primary suspension for a hoofed animal that enables ambulation, the hoof is critical to the well-being of the animal. Many problems can plague the hoof. Among these are, cracked or split hoofs. This hoof plate was discovered to be beneficial in the treatment of cracked or split hooves by forcing the crack to narrow as the hoof grew. Since the shoeing nails were retained by the hoof plate against pulling through the hoof wall.

In addition to cracked hoofs, hoofed animals unfortunately develop many other problems associated with the hoof. Among the most prevalent of these other problems are shelly and splayed hoofs and laminitis. Laminitis is a condition which can strike any hoofed animal and ungulates with a very high morbidity and frequent mortality rate. It is primarily known to affect equine animals and often spells the end of a horse's career, or results in euthanasia. Laminitis manifests itself in acute lameness, usually of the fore feet, but sometimes also the hind feet.

The hoof of equines is a hard hoof composed of dense keratinised fibers. The coffin bone of the digit is effectively suspended within this structure and attached to the growing hoof by a large number of the microscopic interdigitating horny and sensitive laminae. The sensitive laminae attached to the coffin bone and carry the nerves and blood supply. Both types are connected together in a dovetail fashion that suspend the coffin bone within the hoof. These structures have a highly complex and poorly understood system of arterio-venous anastamoses which regulate the blood supply to the lamina to compensate for various physiological states and mechanical stress.

Laminitis is caused by ischemia of the sensitive laminae, which begin to inflame and degenerate. This disrupts the interconnection with the horny laminae, causing the coffin bone to begin to detach from the inner hoof wall and rotate and/or sink. Inflammation of these structures results from disturbance of control of the arterio-venous anastamoses and leads to a compartment syndrome where the blood flow and, hence, nutrient and oxygen supply to the laminae is compromised.

Without proper attachment to the inner hoof wall, the weight of the horse and the forces of movement drive the coffin bone down, damaging arteries and veins, and crushing the living tissues of the coronary band and sole. This leads to unrelenting pain and a characteristic lameness. This condition can proceed through several stages. At the beginning it produces mild inflammation, which can be treated with little permanent damage, which is uncommon. Most cases of laminitis progress to chronic conditions in which the coffin bone further sinks, leading to the condition known as founder, in which the animal is unable to support itself upright on its legs. In larger animals, the coffin bone can actually protrude through the sole of the foot, resulting in total loss of use of the animal. This condition is irreversible and extremely painful and the animal often most be put down.

The exact cause of this condition is unknown, but has been known to be preceded by instances of the following: obesity/overeating/overfeeding, resulting in the excessive ingestion of carbohydrates; toxaemia, resulting from a disease involving a septic or toxic focus; mechanical trauma, resulting from prolonged work on hard surfaces; iatrogenic, resulting from administration of corticosteroids or retained afterbirth; hormonal, resulting from thyroid or pituitary dysfunction; stress, caused by overworking, especially in prolonged overly hot or cold conditions; and poor trimming or shoeing which forces the leg into an abnormal orientation.

Laminitis is an all-too common condition, experienced by many thousands of horses world-wide, for which no reliable treatment has heretofore been found. As such, it produces a multi-million dollar loss of animals to the equine industry.

Of course, the best treatment for laminitis is prevention, but, since the cause(s) are unknown for certain, this is impossible. Many treatments for laminitis have been proposed and tried. Among these are mechanical hoof support treatment with special shoes, as in U.S. Pat. No. 4,422,509, or inflatable boots, as in U.S. Pat. No. 5,174,382, or cushioning pads, as in U.S. Pat. Nos. 6,283,219 and 4,794,991. Other treatments comprise administration of topical or internal medicaments, as in WIPO Publication WO03007952 and Canadian Patent No. 2273183, and administration of acoustic shock waves, as in Published U.S. Patent Application No. 2004/0092819. None of these treatments has proved effective in successfully treating or curing laminitis.

Thus, there is a need for an effective treatment for laminitis.

Another problem which plagues hoofed animals is broken hoofs in which a major portion of the hoof wall is broken off and missing. This condition makes shoeing of such an afflicted animal nearly impossible, since normally the ends of the shoeing nails are anchored in the hoof wall. Without shoes, the animal is very difficult to rehabilitate, and can result in the loss of the animal.

There is a need for a means and method enabling shoeing an animal with a broken hoof.

Further problems frequently encountered with horses are shelly hooves, or hooves with thin, weak walls, and splayed or toe-out foot (similar to "duck foot" in humans). Both conditions are detrimental to the health and well-being of a horse or other hoofed animal.

There is a need for an effective treatment for shelly hoof and splayed foot.

SUMMARY OF THE INVENTION

Accordingly, it is one object of this invention to provide an effective treatment for laminitis and other hoof problems. It is another object of this invention to provide a means and method enabling shoeing an animal with a broken hoof. It is a further object to provide an effective treatment for shelly hoof and splayed foot.

As noted above, the inventor herein developed the patented hoof plate and has successfully used it in shoeing many horses. As use of the hoof plate progressed, interest developed in what would happen if a hoof plate were left in place longer than the recommended 6-8 week period between shoeings, as the hoof continued to grow. Several horses with laminitis were shod with use of the hoof plate. Inadvertently, these shoes were left on for longer than the recommended 8 weeks. (Actually for 12-16 weeks). As a result, constricting the hoofs during normal hoof growth rendered the afflicted horses unable to stand, and they laid down for three days. To the surprise of all, these horses were thereafter able to stand. This was discovered to be accompanied by a recession of the laminitic condition.

A formal experiment was then commissioned, and two horses were shod with use of the hoof plates and examined, measured and radiographed. The hoof plates were left in place for over four months. At the conclusion of the test period, the hoof plates were removed and both horses were again examined, measured and radiographed. Surprisingly, the coffin bones in each were found to have experienced a 2-3 degree counter-rotation, exactly opposite to the movement of the coffin bone in a horse with laminitis. Also, hoof measurements showed no adverse growth effect, but surprisingly showed an increase of heel width (frog) that was double the growth of other hoof portions.

Thereafter, a horse with underslung heels and splayed toes on all hooves was shod using hoof plates for two standard 8-week shoeing cycles. At the end, the previous heel defects were found to have been improved. Another horse with superficial cracks in both front hooves was similarly shod for two shoeing cycles. At the end, the cracks had disappeared.

While the exact cause-and-effect relationship has not been ascertained, it is thought that the constriction of the hoof caused by the inability of the growing hoof wall to spread squeezed the laminae interface between the coffin bone and the inner hoof wall, constricting the blood flow and forcing new channels of blood flow throughout the laminae. This is thought to have caused a regeneration of laminae, accompanied by increased connectivity between the inner hoof wall and the coffin bone, reversing the sinking of the coffin bone and re-establishing the support for the horses' feet. Thus, a new treatment for laminitis and for other hoof problems was born.

Thereafter over 140 horses were treated. Of these, 30 were suffering from laminitis progressed to founder, and the remainder had cracked, shelly or splayed hoofs, bruised soles and under-run heels. The hoof plate of this invention was applied to all for periods of 12-16 weeks. Without exception, all improved and none experienced a reversal or deterioration of its hoof condition following removal of the hoof plate.

As experimentation with horses developed, it was discovered that the original hoof plate, with four series of holes on each side, was not adequate to treat larger hooves. Thus a larger version, with five series of holes on each side was developed. This larger size enables the plate to wrap further around the hoof and also normal shoeing use with larger-hoofed animals. Further experimentation indicated that a more permanent anchor for the hoof plate about the hoof was enabled by the use of screws inserted through some of the holes directly into the hoof. This produced a more secure and immovable constriction against hoof outward growth.

As noted above, broken hooves present a challenge to shoeing an animal, since there is insufficient hoof wall in which to anchor the shoeing nails. It has been found that use of a hoof plate, both with and without shoeing, enables re-sectioning or regeneration of the hoof wall, since the hoof plates provides support for the hoof and provides an anchor for the shoe to provide sheltered environment for re-sectioning of the hoof wall.

It has been found advisable to apply an epoxy or other plastic material between the hoof and hoof plate, particularly in the front. This prevents egress of dirt, pebbles or other foreign matter into the inevitable small gap that appears between the outer hoof wall and the hoof plate, or into the hoof crack or missing portion, upon hoof plate installation.

In one aspect, this invention features a method of treating hoof problems, comprising the steps of placing a containing device about the hoof to restrict outward growth of the hoof, as the hoof wall grows, for a predetermined period of time exceeding 8 weeks, and thereafter removing the device to enable normal growth of the hoof wall.

Preferably, this method includes the steps of providing a flexible plate having a plurality of spaced holes as the containing device, wrapping the plate about the hoof wall, anchoring the plate to the hoof by inserting headed fasteners, such as screws through some of the holes and into the hoof wall to constrict anchor the hoof place to the hoof to prevent said outward growth.

The predetermined period can vary, dependent upon the severity of the hoof condition being treated, but extends to 12-16 weeks. The hoof problem usually treated in this manner is laminitis, and the hoof inward containment causes an internal pressure increase within the hoof, which affects the existing pattern of blood flow and effects regeneration of the hoof laminae to improve attachment of the animal's coffin bone to the inner hoof wall. In addition hoof problems such as broken walls, shelly, cracked or splayed hooves, can be treated. The animal can be treated shod or unshod, depending on the type and severity of the hoof problem.

In another aspect, this invention features a method of shoeing an animal's cracked hoof, comprising providing an elongated strip of flexible plate having a series of spaced holes along either side of a centerline wrapping the plate about the hoof, applying a shoe to the hoof by applying screws through some of the holes into the hoof wall.

In a further aspect, this invention features a hoof plate for anchoring shoes to the hooves of large-hoofed animals, comprising an elongated flexible plate having five sets of spaced holes along either side of a centerline, said holes being sized for receiving the ends of shoeing nails therethrough. Preferably, the hoof plate has a central axis, with wings extending from the axis at an angle of 25 to 50 degrees and contain the apertures.

These and other objects and features of this invention will become more readily apparent upon reference tot the following detailed description of a preferred embodiment, as illustrated in the accompanying drawings, in which:

DESCRIPTION OF THE PREFERRED EMBODIMENT

Figure 1A:
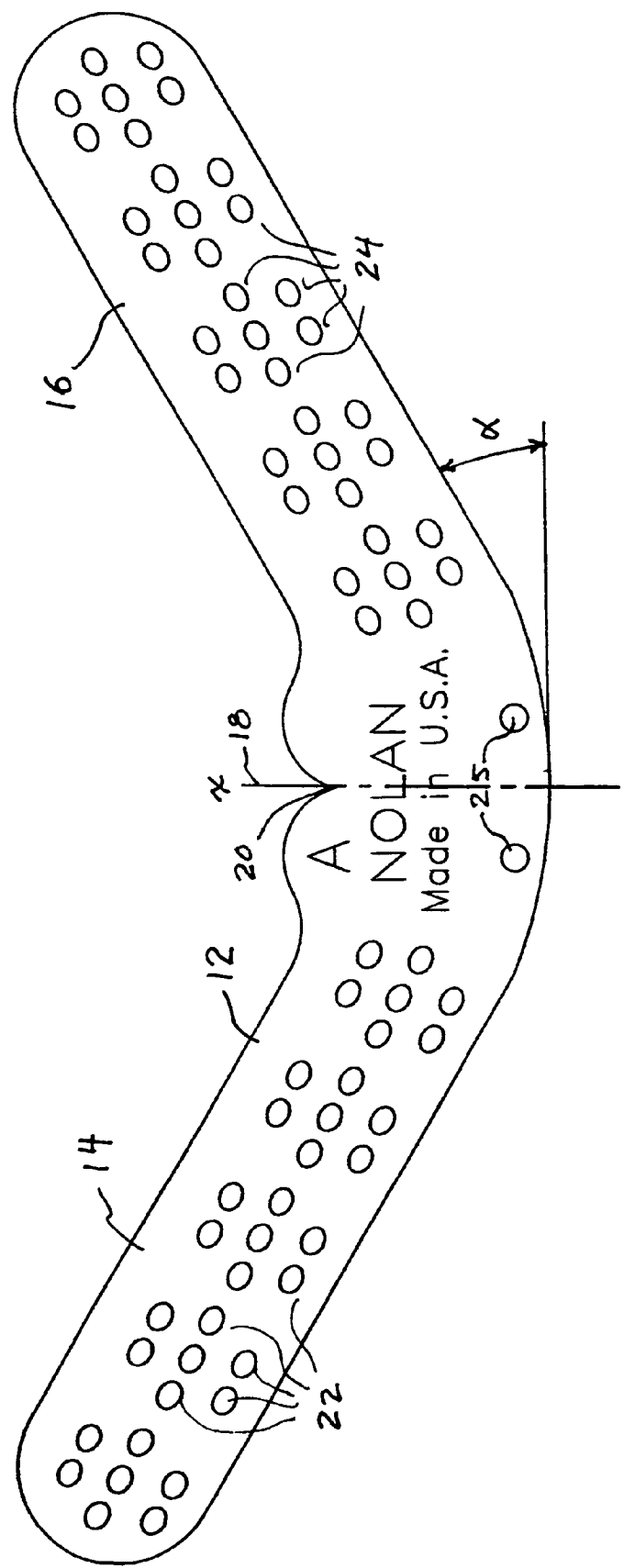
FIG. 1a is a plan view of a hoof plate according to this invention, utilizing a series of five groups of holes on a side, having a wing angle of 30 degrees.

Definition: As used herein the term "hoof plate" refers to the appliance of the type disclosed in my earlier U.S. Pat. No. 6,571,881. The plates depicted herein are improvements of the hoof plated disclosed in this earlier patent. They have been extended in length, to encapsulate more of the hoof circumference, and contain a different hole pattern, to accommodate the attachment screws and shoeing nails,—both improvements developed specifically for use in the treatment method of this invention.

In FIGS. 1a, 1b, 1c, 1d, and 1e, a hoof plate 10, according to this invention is a flat piece of galvanized sheet metal 12 that comprises a pair of wings 14, 16 that extend from a center axis 18 that extends from a central notch 20 in the upper surface of sheet metal 12.

Wings 14, 16 include a series of five spaced clusters of seven closely-spaced, punched oval apertures 22, 24, and a pair of frontal round apertures 25. Of course, hoof plate 10 could be made from other materials, such as aluminum, which are hard, but are readily deformable to conform to the curved surface of an animal hoof. It could also be made from a heavy mesh, which necessarily has apertures. Apertures 22, 24, 25 are sized to perform a dual function, that of receiving screws, as later described, and the end of shoeing nails.

Figure 1B:
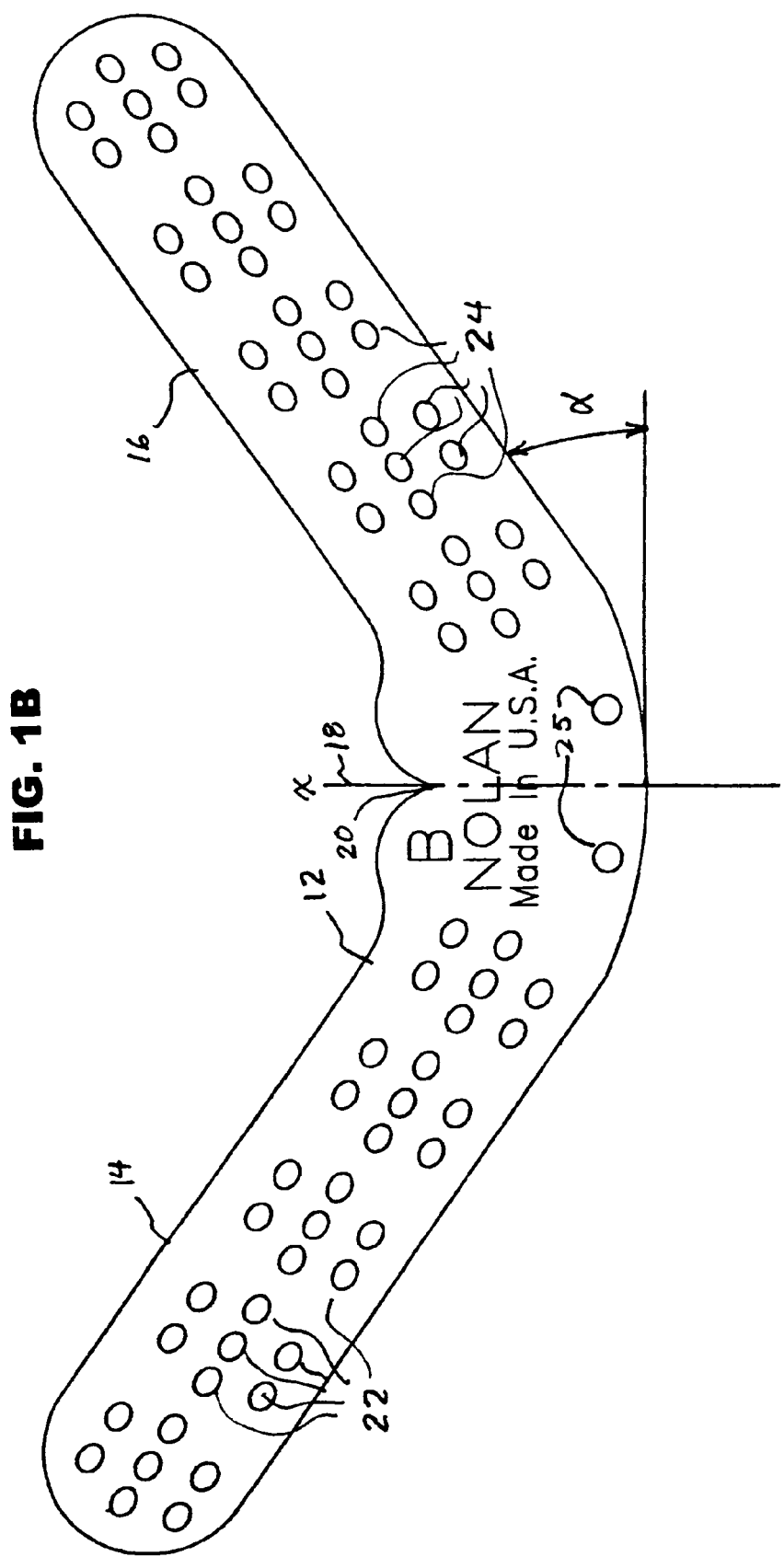
FIG. 1b is a view similar to FIG. 1a, but with a wing angle of 35 degrees.

Various types of horses and mules have different shaped hooves, which are trimmed by the farrier at different trim angles, depending on how the animal is to be worked. For example, horses such as hunters and jumpers have hooves that are trimmed at trim angles different from reining horses, which are different from pleasure horses, which may be different from mules. The lower edges 26, 28 and wings 14, 16 are angled upwardly relative to a line x perpendicular to center axis at a wing angle, denoted $\alpha$, to accommodate different hoof trim angles. The wing angle $\alpha$ can vary from approximately 25 degrees to 50 degrees, depending on which type of animal it is to be applied to, the trim angled to which the hoof is trimmed, and whether the front or hind hooves are being shod. A common wing angle $\alpha$ to fit most horses' front hooves is 30 degrees, as illustrated in FIG. 1a. A common wing angle $\alpha$ to fit most horses' hinds hooves, is 35 degrees, as illustrated in FIG. 1b.

Figure 1C:
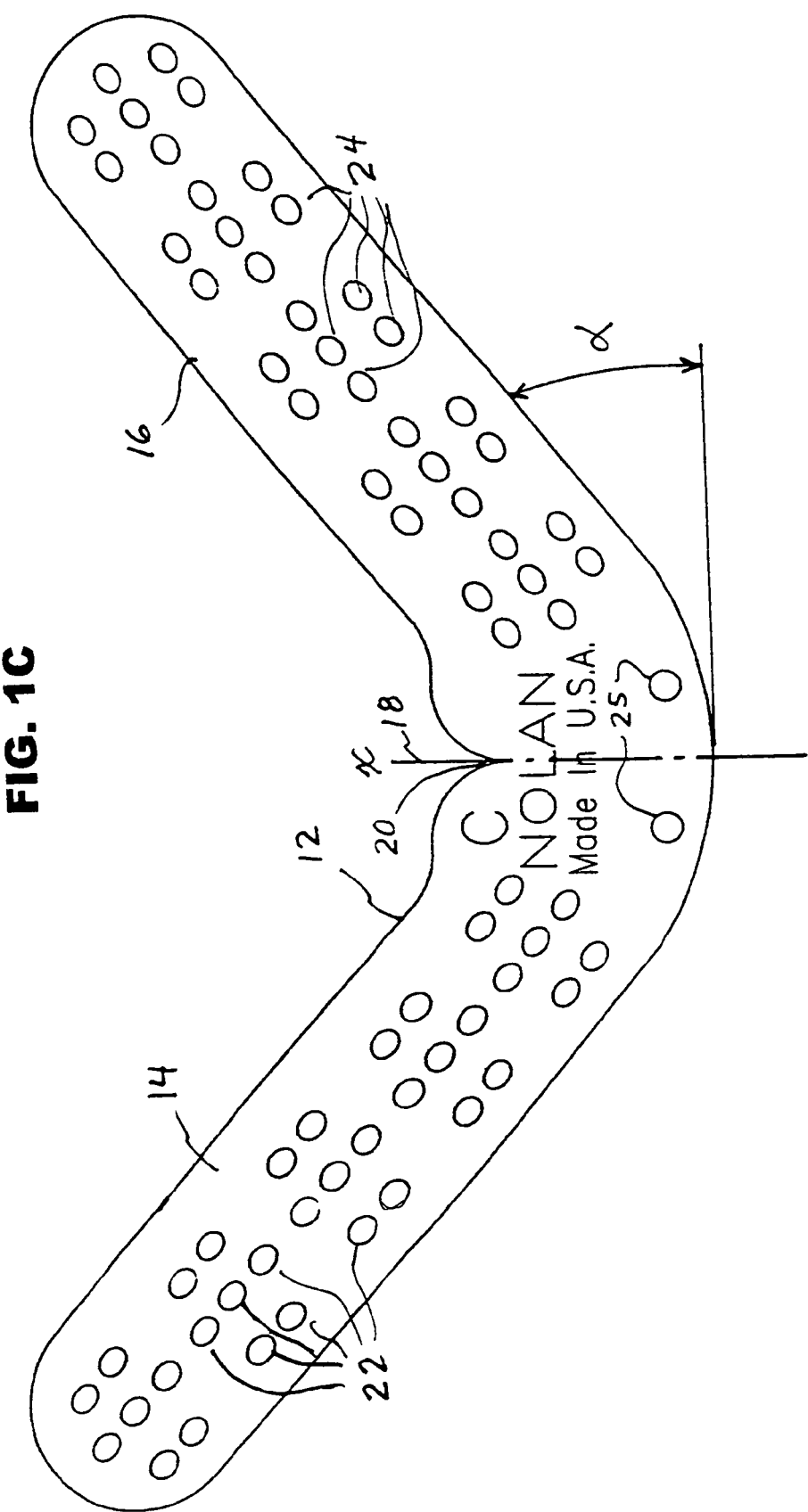
FIG. 1c is a view similar to FIG. 1a, but with a wing angle of 40 degrees.
Figure 1D:
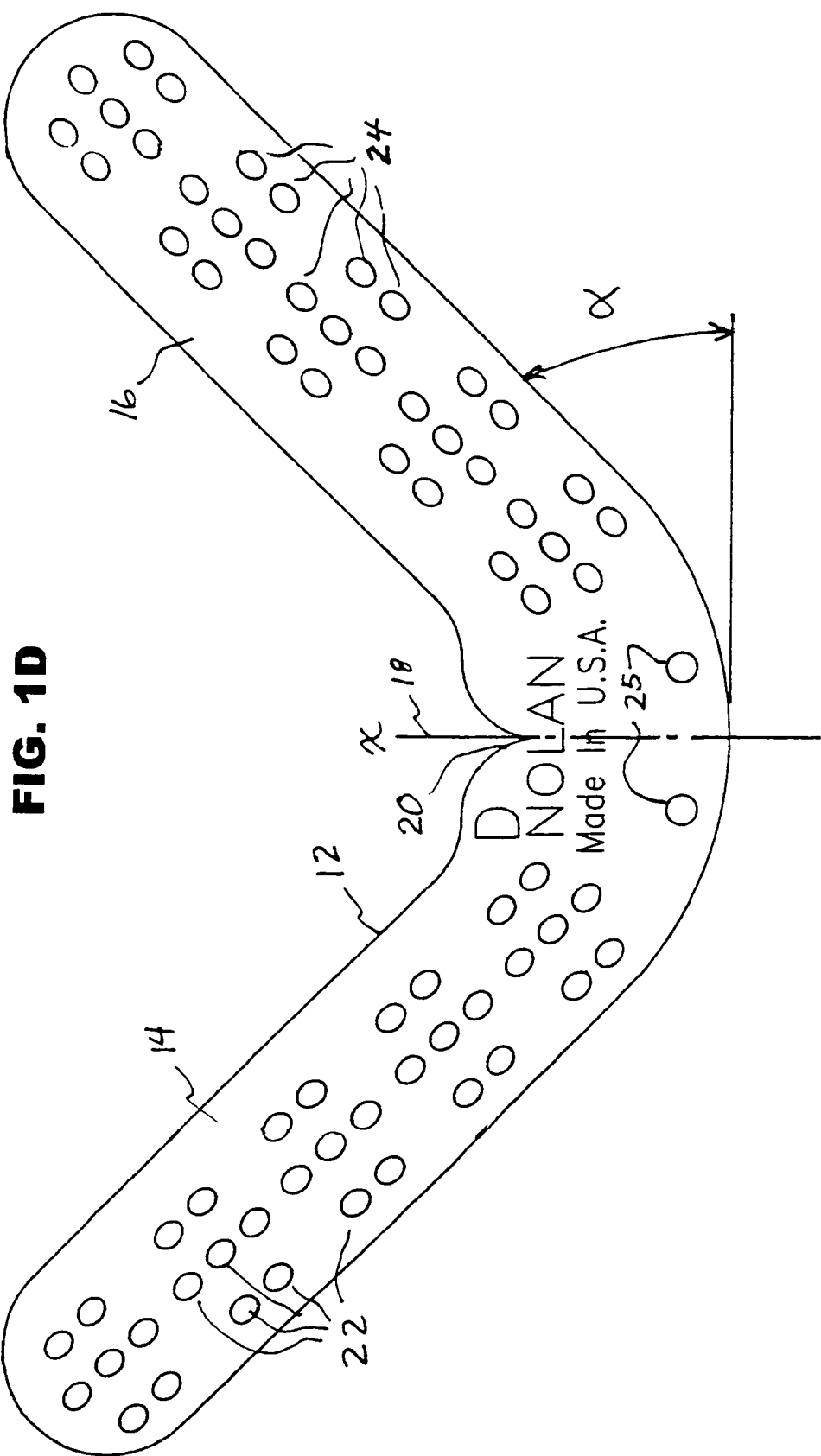
FIG. 1d is a view similar to FIG. 1a, but with a wing angle of 45 degrees.
Figure 1E:
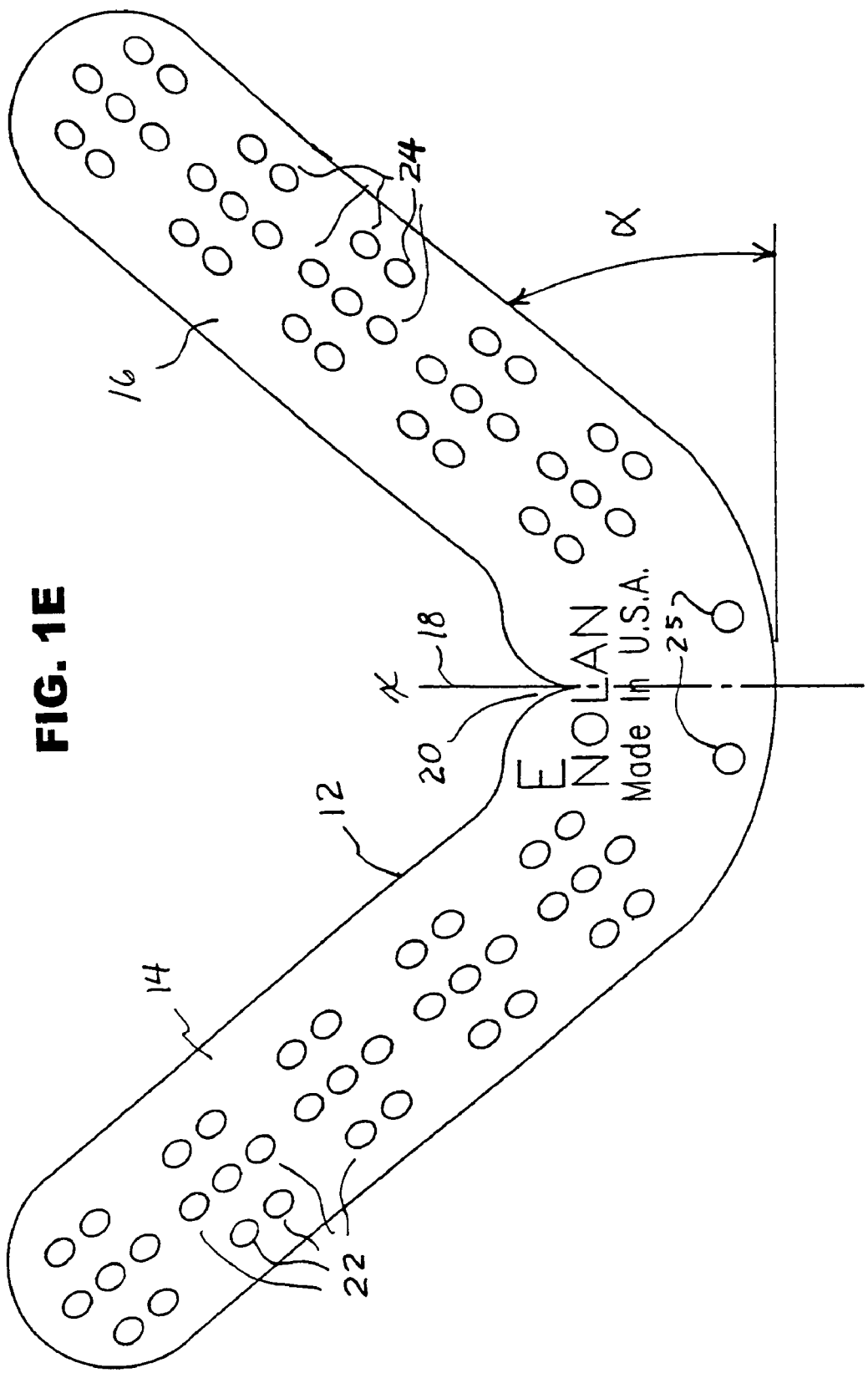
FIG. 1e is a view similar to FIG. 1a, but with a wing angle of 50 degrees.

Hoof plate 10 is offered in several other standard configurations of wing angle $\alpha$, as shown in FIGS. 1c, 1d and 1e. The higher angle hoof plates are for use with bovines. Special situations are accommodated by having the farrier trim the wings 14, 16 so that the lower edges 16, 18 to conform to the lower edge of the trimmed hoof.

Hoof plate 10 is preferably made of a thin, galvanized sheet metal that is easily bent around an animal's hoof, and can be readily trimmed by conventional shears to conform to the bottom of the hoof when in place. This will accommodate the various trim angles given the hoof by the farrier when trimming the hoof. Hunters and jumpers, pleasure horses, reining horses, such as barrel racers and roping horsed, show horses of all types, and other horses and other animals, such as mules, may require different hoof trim angles, according to the owners' requirements. The hoof trim angle will determine which angled version of the hoof plate to use, or whether the hoof plate 10 must be trimmed.

Figure 2:
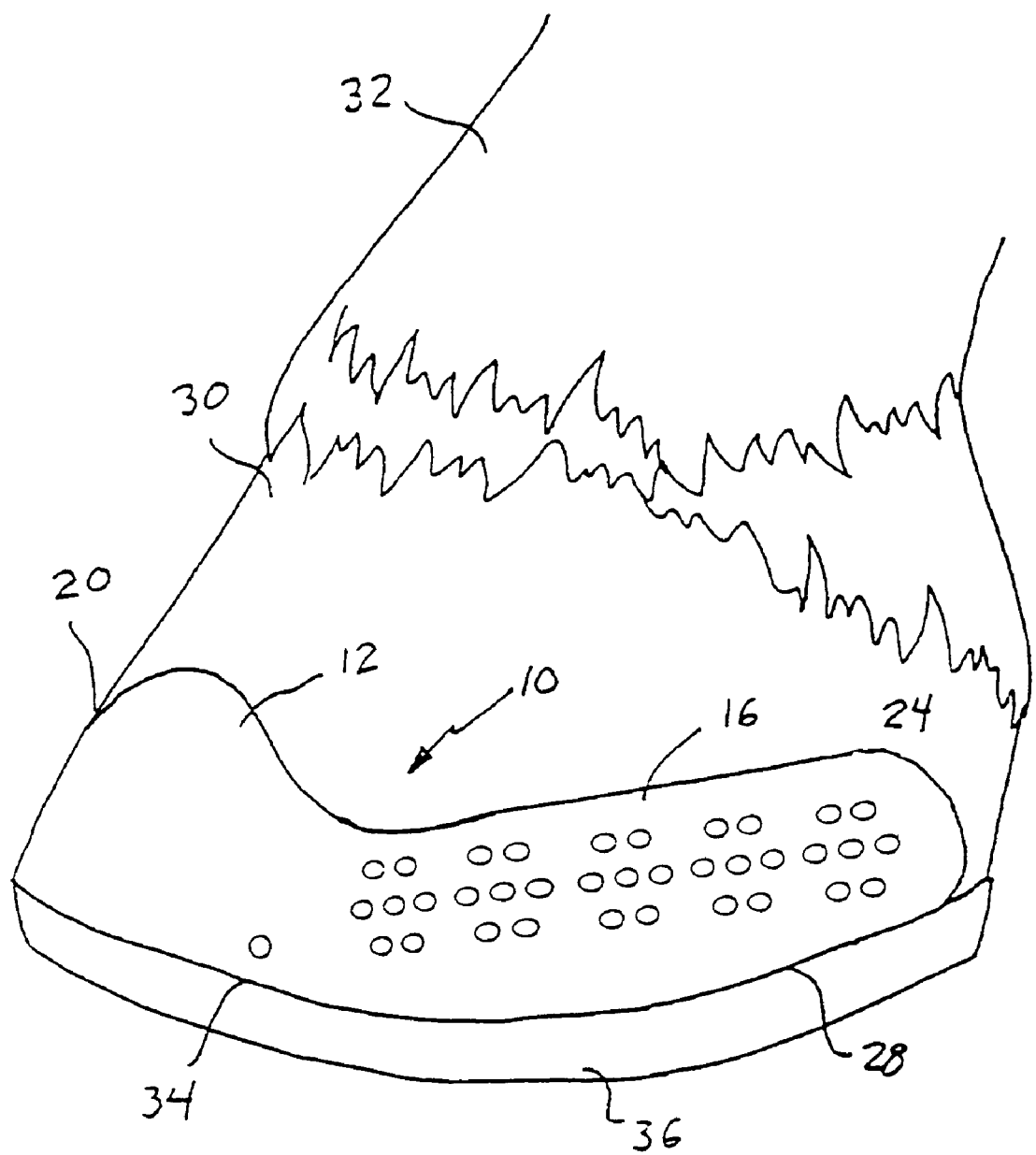
FIG. 2 is a side view of an animal hoof, showing the hoof plate of this invention wrapped about the hoof prior to nailing.
Figure 3:
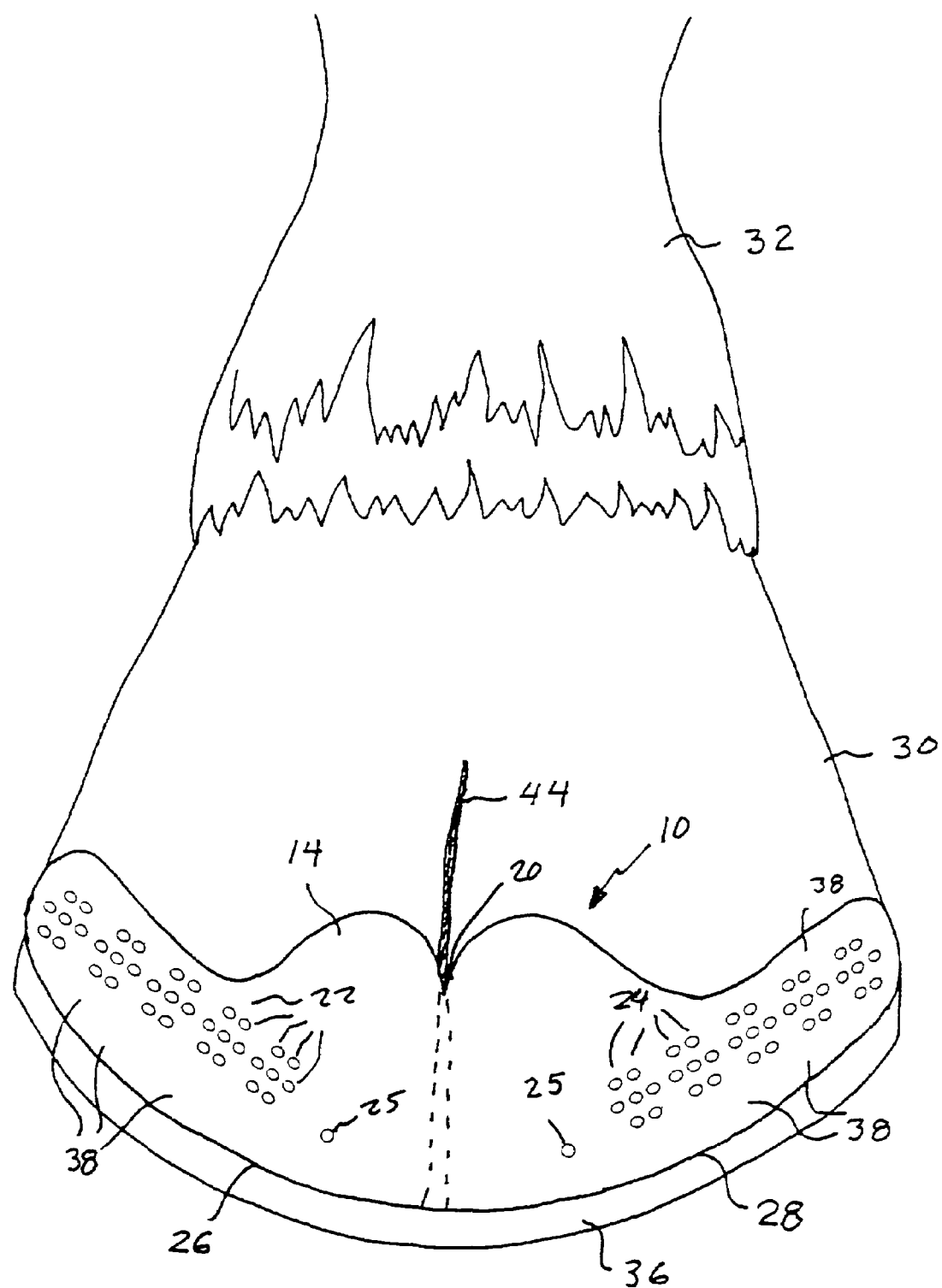
FIG. 3 is a front view of an animal hoof having a frontal crack, showing the hoof plate of this invention wrapped about the hoof prior to nailing.

FIG. 2 (normal hoof) and FIG. 3 (hoof with a crack 44) illustrate hoof plate 10 as it is initially applied to a hoof 30 or 31' at the distal end of leg 32 of an animal, here illustrated as a horse. Wings 12 and 14 are bent around the contour of the wall of hoof 30, with lower edges 26, 28 conforming to the lower edge 34 of hoof 30. Hoof plate 10 is sufficiently malleable to hold conformation to the hoof shape.

After hoof plate 10 is in place, a conventional shoe 36 is applied to hoof 30 and nails are driven up through shoe 36 and through the side walls of hoof, to project through one of the apertures 22, 24 and are clinched over against the outer surface of hoof plate 10, as detailed in the aforementioned U.S. Pat. No. 6,571,881 to more securely held on hoof 30, since it is more difficult for nail 38 to pull through hoof plate 10 than through a hoof if hoof plate 10 were not used, as is conventional.

Figure 4:
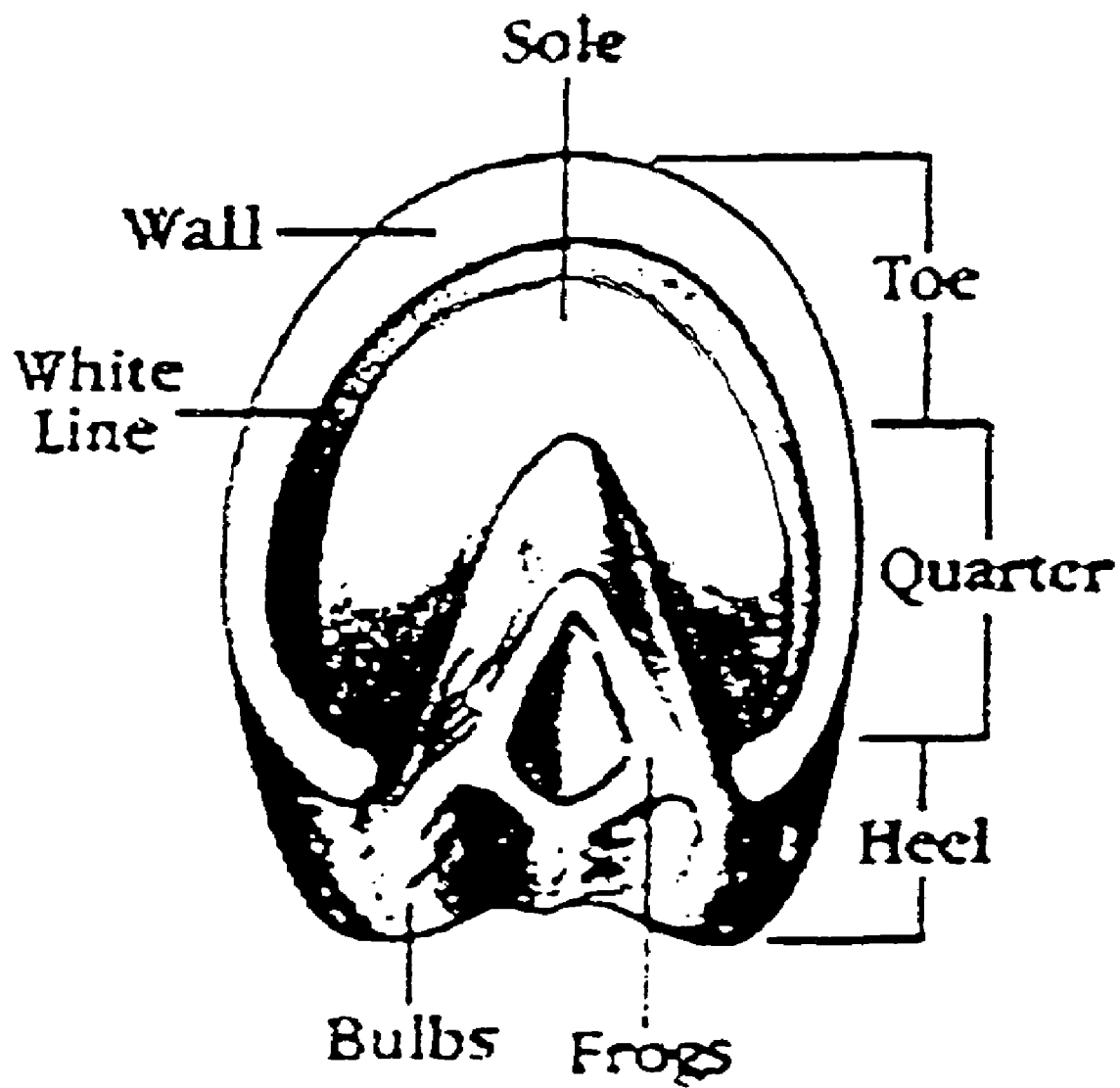
FIG. 4 is a bottom view of an animal hoof.
Figure 5A:
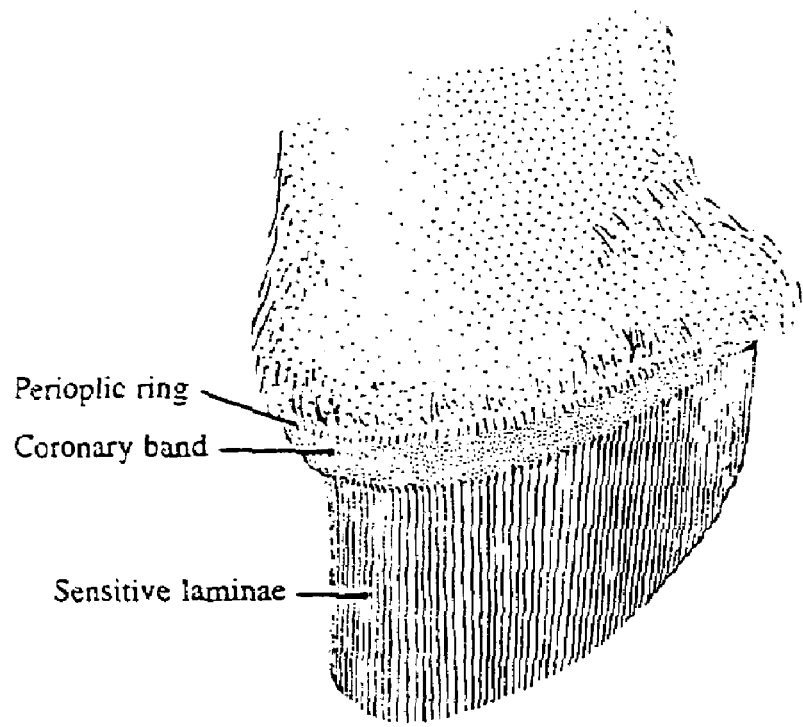
FIG. 5a is a perspective view of animal foot with the hoof removed, showing the connective sensitive laminae.
Figure 5B:
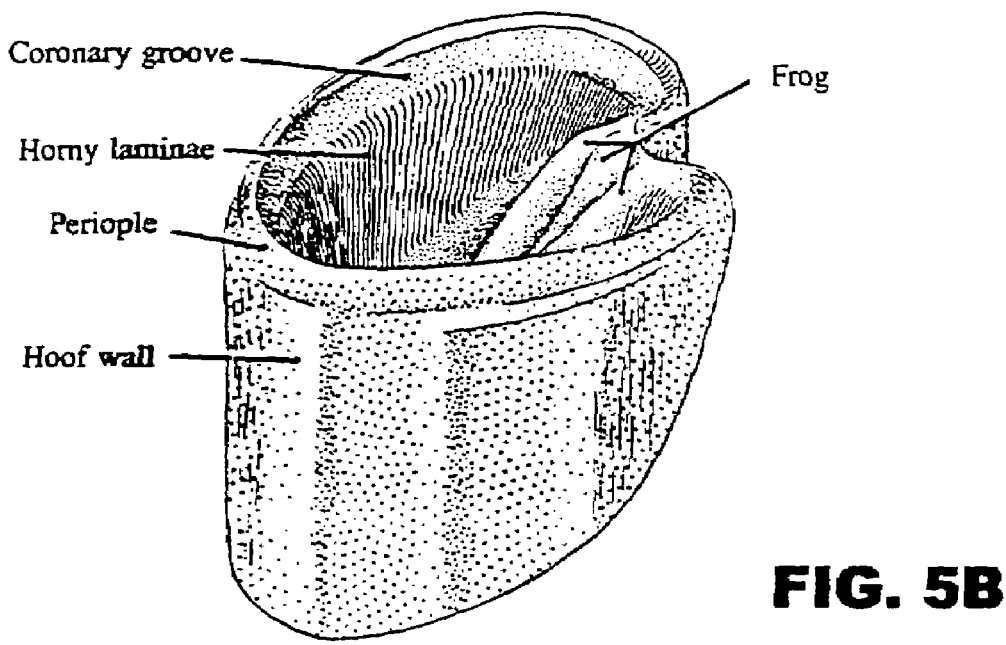
FIG. 5b is a perspective view of an animal hoof removed from the foot of FIG. 5a, showing the connective horny laminae.
Figure 6A:
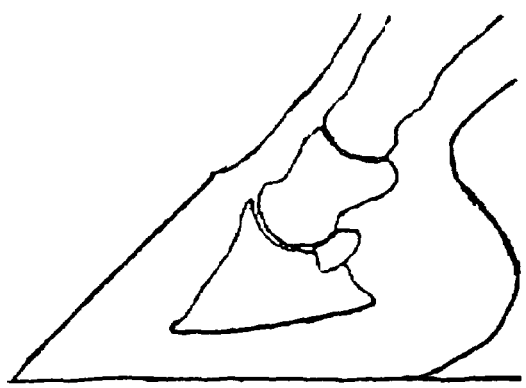
FIG. 6a is a sectional sketch of the main parts of a horse's hoof, shown with the coffin bone in normal position.
Figure 10A:
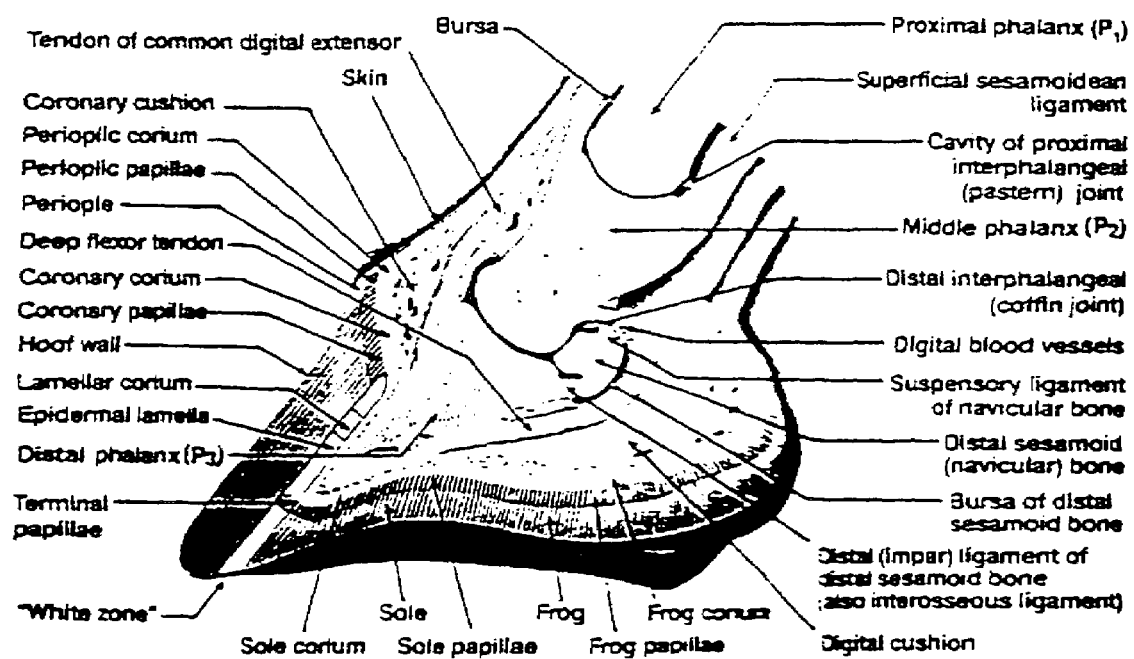
FIG. 10a is a diagram of the equine foot, illustrating the hoof and hoof capsule, with the major component parts identified.
Figure 10B:
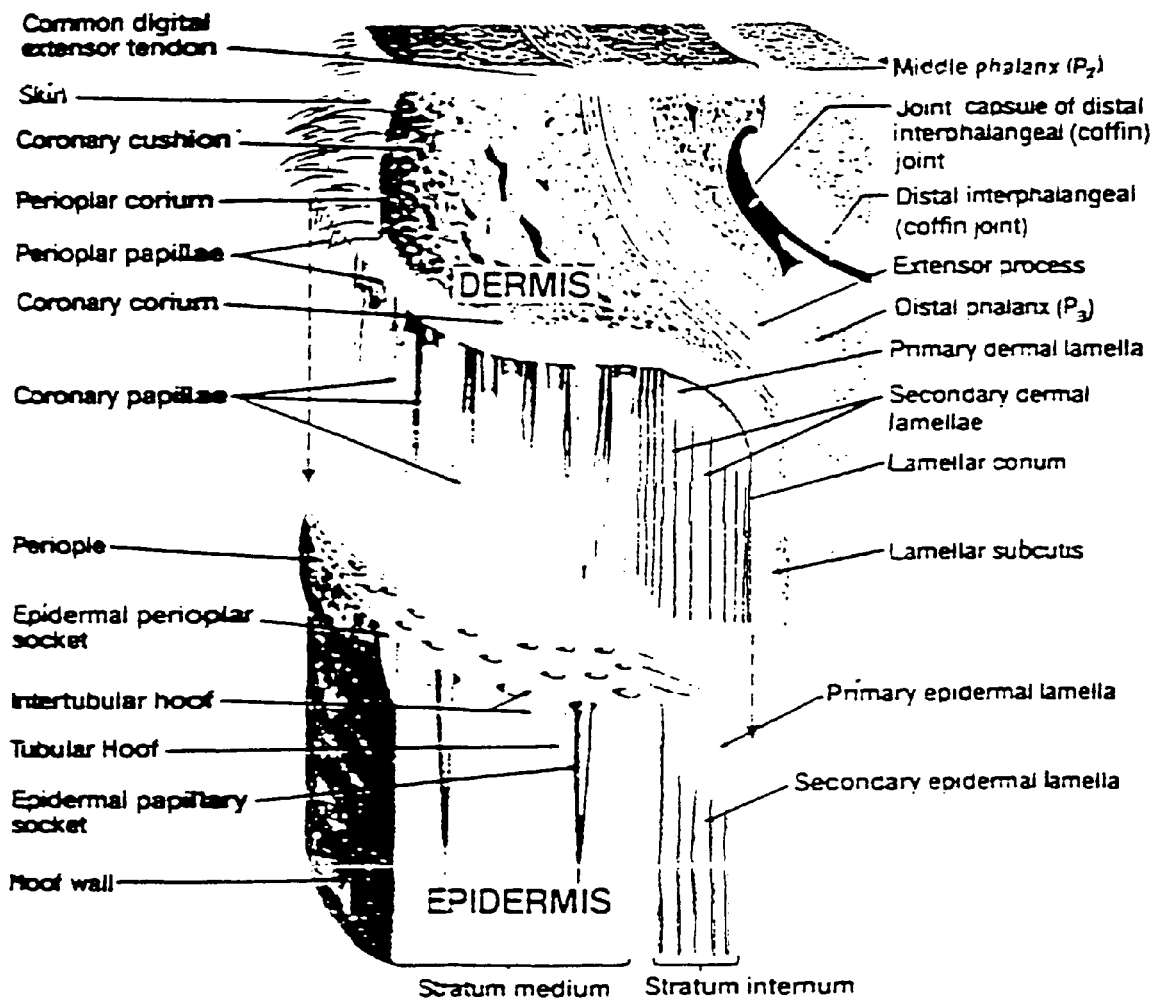
FIG. 10b is a diagram of the coronary region of the hoof, with the major component parts identified.

FIG. 4 illustrates a hoof as viewed from the bottom and shows the major external hoof parts. FIGS. 5a and 5b show a horse's foot with the hoof removed. FIG. 10a shows the interior structure of en equine foot, including the hoof. Clearly shown are the parallel microscopic fibers (termed lamellae or laminae) that secure the hoof to the foot. The foot terminates in the third distal phalanx ("P3"), or coffin bone (see FIGS. 6a and 10b), which mounts hundreds of parallel fibers known as sensitive laminae. These sensitive laminae interdigitate with the horny laminae carried on the interior wall of the hoof. These laminae cooperate to suspend the horse's foot with the hoof.

Figure 6B:
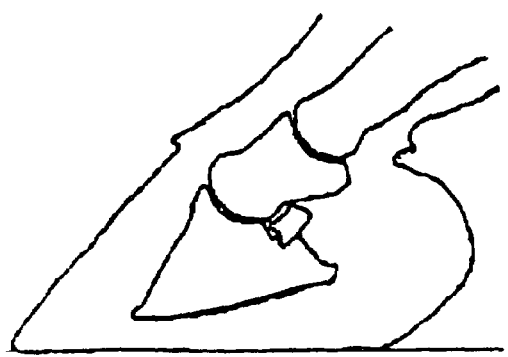
FIG. 6b is a view similar to FIG. 6a, but showing the coffin bone rotated and dropped as a result of laminitis.

Laminitis causes this interface of the two types of laminae to degenerate. As this degeneration progresses, the interdigitate laminae become less able to suspend the coffin bone naturally within the hoof and the coffin bone, and the horse's leg with it, since within the hoof, as shown in FIG. 6b. This sinking is accompanied by a rotation of the coffin bone as illustrated. The sinking can progress to a point where the coffin bone engages the frog. In this condition, ambulation of the horse becomes painful, and meaningful use of the horse is lost. Further progression can lead to permanent crippling of the horse, which must then be destroyed.

It has been established that use of the hoof plate dramatically extends the life of a shoeing. Normally, a horse must be re-shod every 6-8 weeks, and more often if the horse subjects its shoes to excessive side forces, such as hunters, jumpers, and reining horses do. Due to the growth of the hoof, a horse or other animal will grow out of its shoes, thus requiring hoof trimming and shoeing. Trials using the hoof plate of this invention have shown that a shoeing can last upwards of 16 weeks without harming the animal's hooves.

It was initially discovered that the normal 8-week shoeing of a horse can prevent the cracked part of the hoof from spreading apart during animal movement, because the hoof plate holds the hoof parts securely together while it heals. Also, the hoof plate, especially when used with an epoxy or other plastic substance in the spaces between the hoof plate and the hoof wall, provides a barrier to the intrusion of foreign matter into the hoof, thus preventing infection of the wound. It was not known what effect would ensue if a horse were shod with a hoof plate for a period of time exceeding 8 or 16 weeks.

To test the long term effects of shoeing with the hoof plate for extended periods of time, several; experimental shoeing of horses was conducted.

Experiment 1

Purpose:
  To determine if the application of a hoof plate for an extended period would damage a horse's hooves.
Location: Lubbock, Tex.
Timeline:
  Sep. 10, 2003: 2 horses were trimmed for shoeing, and transported to a veterinarian for examining, radiographing and measurement by a veterinarian.
  Sep. 11, 2003: Both horses were returned to test location and shod using hoof plates by a farrier, and turned out in a 150'×150' paddock, with free-choice grass, hat, salt and minerals, and supplemented with feed as needed. All hoof plates were inspected on a weekly basis by the onsite research manager.
  Jan. 22, 2004: Plates and shoes were removed.
  Jan. 23, 2004: Horses were transported to veterinarian and examined, radiographed and measured.
Summary of Observations:
  Hoof plates were on horses for 4 months, 10 days. At 14 weeks, both horses showed signs of being slightly unsound. Signs resolved in three days without intervention; horses remained sound for remainder of test period.
  Radiographs detected no abnormalities, except a 1-2 degree counter-rotation of coffin bone noted. Measurements showed surprising increase in heel width (frog) to be double that of other hoof measurement enhancements.

Experiment 2

After Experiment 1, a less rigorous experiment was made on two additional horses. Hoof plates were placed on two additional horses. No measurements or radiographs were taken, but photographs were taken. Horse #1 had underslung heels and splayed toes on all hooves. Horse #2 had superficial cracks in both front hooves, running from the coronary band to the toe. Both horses were fitted with hoof plates and shod for two 8-week cycles. At the end, Horse #1 hooves showed a return to normal growth rings, elimination of concave dish in hooves, and heels were less undershot. Horse #2 hoof cracks were stopped and did not return.

Figure 7:
FIG. 7 is a photo of a horse with laminitis, showing a hoof plate secured to the horse's hoof with screws and also securing shoeing nail ends.
Figure 8:
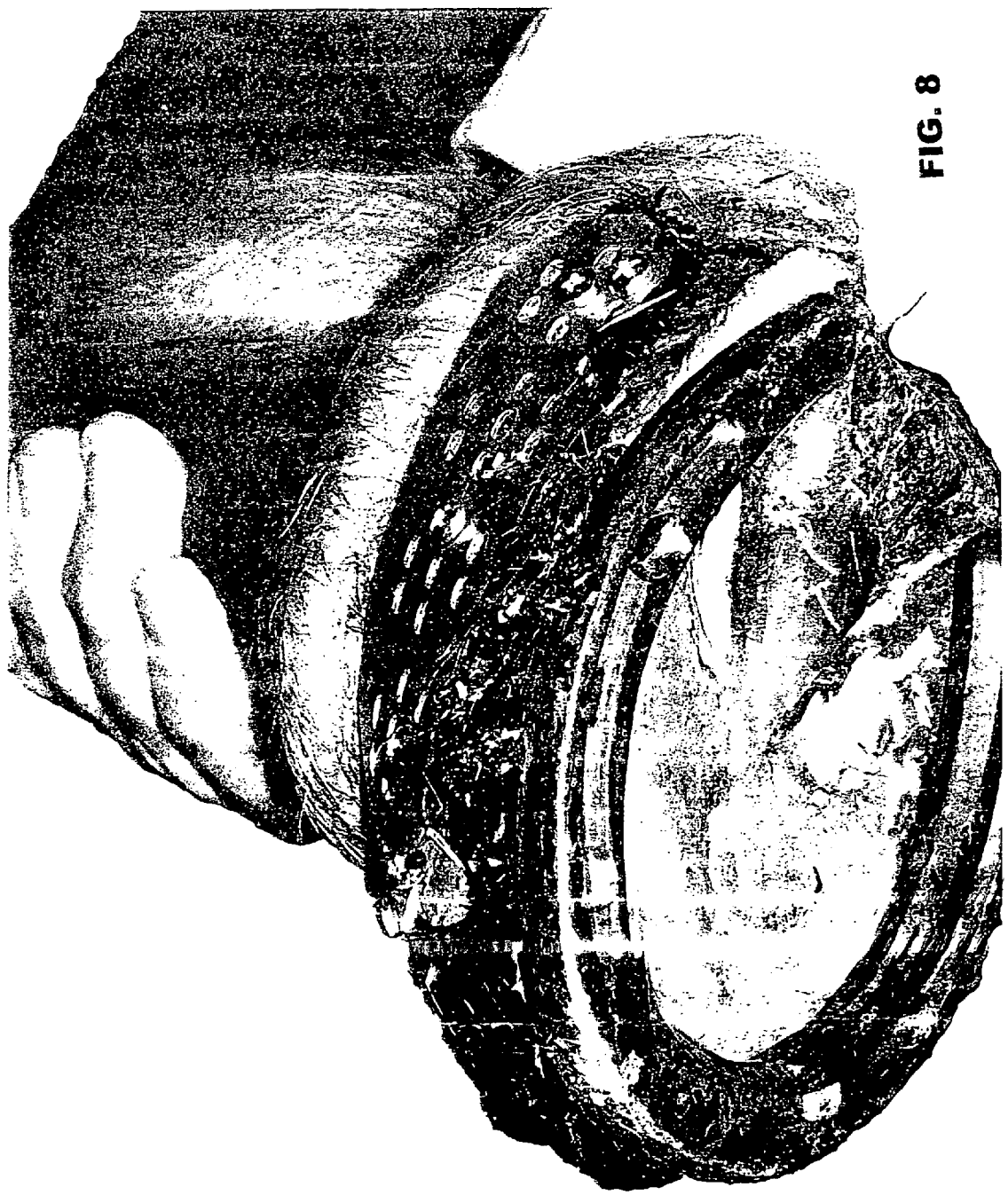
FIG. 8 is photo of the bottom of the hoof of FIG. 7, showing details of the shoeing.
Figure 9:
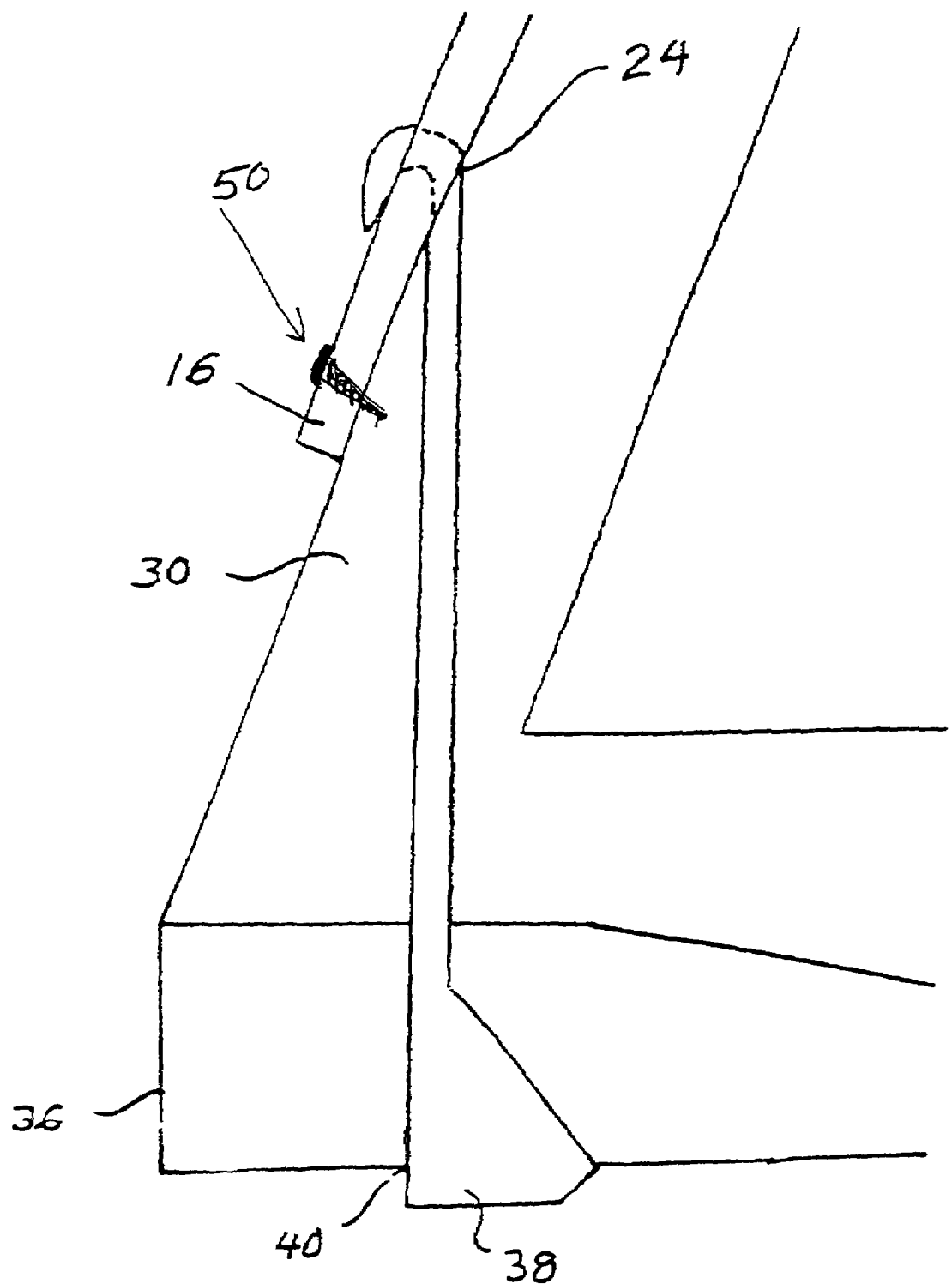
FIG. 9 is an enlarged partial sectional schematic view of hoof of FIGS. 7-9, illustrating one of the securing screws and a clinched nail securing the shoe to the hoof and clinched retention by the hoof plate.

FIGS. 7, 8 and 9 show various views of a hoof of one of the horses participating in the Experiments. These illustrate a hoof plate secured to a hoof by screws 50 and as an anchor for the clinched ends of shoeing nails 40, all of which are inserted through the oval apertures 22, 24. The screws were screwed through the apertures into the hoof itself, thereby anchoring plate against movement or removal. The resultant containment of the hoof, which prevents outward growth, forces the growth inward, increasing internal pressure.

Figure 10C:
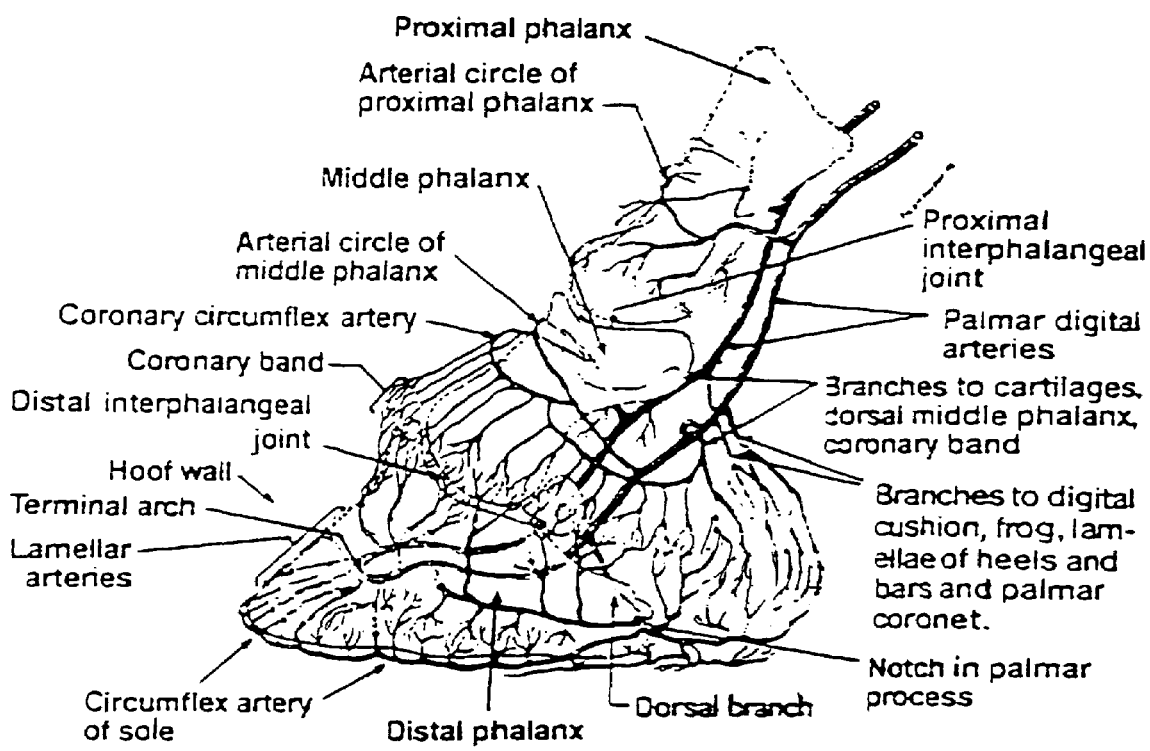
FIG. 10c is a diagram of the main arteries of the equine foot, showing especially the extent of the circumflex artery.
Figure 10D:
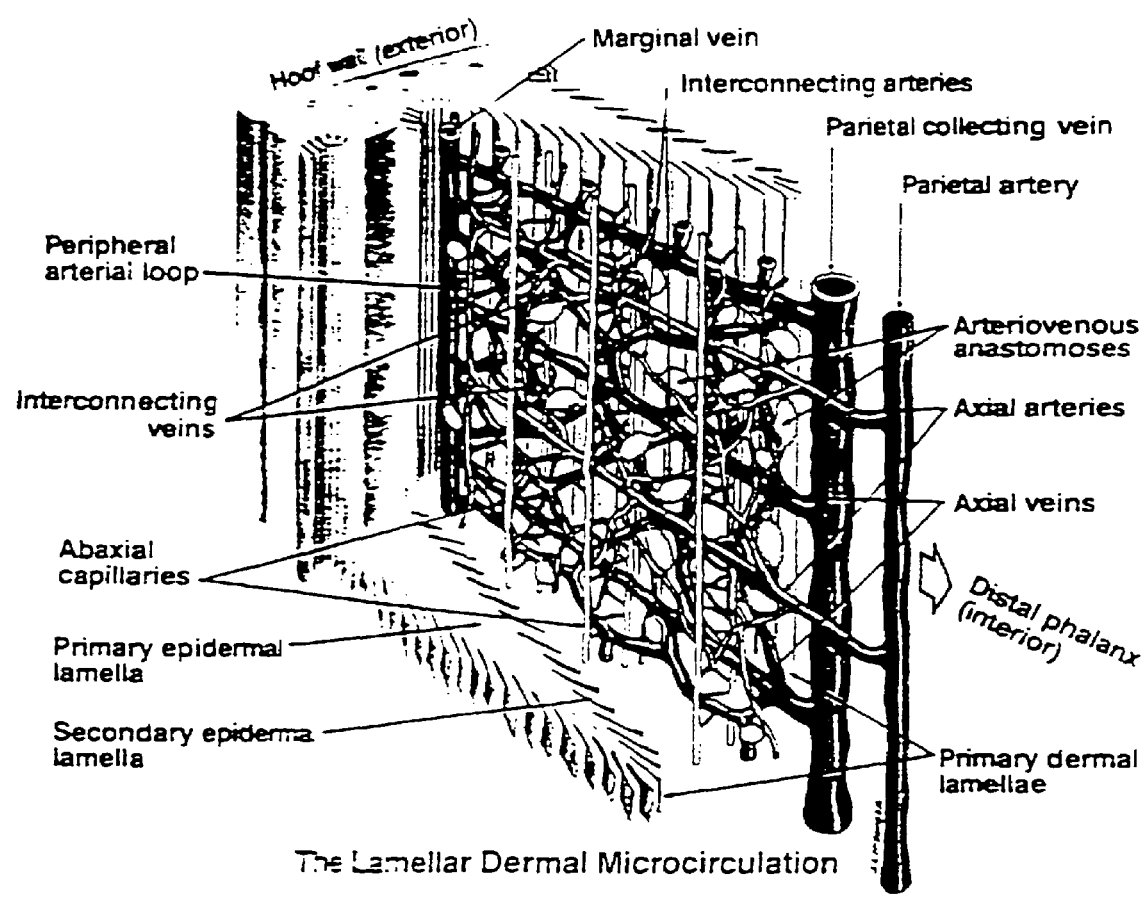
FIG. 10d is a diagram of the lamellar dermal microcirculation, showing blood flow in the in and around the lamellae.

As a result of these experiments, it seems clear that the application of constricting hoof plates for extended periods has not had a deleterious effect on horses' hooves, but, rather, has produced several beneficial effects, namely, counter-rotation of the coffin bone, thickening of the heel, reversing splaying, hoof wall thickening, and crack elimination. It appears that the constriction of the hoof caused by the inability of the growing hoof wall to spread squeezed the laminae interface between the coffin bone and the inner hoof wall, constricting the blood flow and forcing new channels of blood flow throughout the laminae (see FIGS. 10c and 10d). This appears to have caused a regeneration of laminae, accompanied by increased connectivity between the inner hoof wall and the coffin bone, reversing the sinking of the coffin bone and re-establishing the support for the horses' feet.

The following analysis of cause-and-effect was made by Researcher and Hoof specialist Mike Savoldi: "Screwing the hoof plate onto the hoof eliminates the bony structure from sinking in the toe and prevents the hoof wall from migrating away from the foot. Often, pain comes from the destabilization of the hoof capsules. As tissues stretch between the hoof wall and bone structure, the hoof plate stabilizes the forward migration of the hoof wall, providing support for the hoof sole. Redistributing the forces (pressures and stresses) throughout the hoof capsule, in part, enhances and/or redirects the blood flow through the coronary band. Further, decreased vibration lessens the sensitivity of the sensory nerves." With regard to the use of a special shoe with the hoof plate, he further stated that: "The heart bar (or any other horseshoe typically used) is an orthopedic that stabilizes the sole, and that combination results in the reduction of tissue shearing and allows rapid healing."

After experiencing success with horses treated with the hoof plate in accordance with the treatment method of this invention, veterinarians have concluded that, with the increased blood flow appears to increase the actual size of the distal cushion and frog, via improved oxygen levels and other important nutrients needed by these areas of the hoof. It was concluded that the distal cushion is enlarged within its cavity, and it is likely that this increase is contributing to the rotation of the entire hoof capsule, which was observed in conjunction with the rotation of the coffin bone, thus resulting in an improved hoof within the 12-16 week treatment period. The animal experiences less pain due to the inability of the hoof to spread, as is normal, during walking, thus preventing further stress on the laminae.

Thus, a new treatment for laminitis and for other hoof problems has been developed.

It is expected that further experimentation and experience by veterinarians, owners, farriers and researchers will prove that the use of the hoof plate and the methods disclosed herein will provide the following benefits for the equine industry:
1. Enabling laminitis therapy through increasing the strength of the horny laminae, increasing the growth of the frog, increasing tissue growth in the sole of the hoof.
2. Containing and restricting growth of excessive hoof flare.
3. Containing sinking and rotation of the coffin bone, resulting in a normalizing effect.
4. Effectively treating cracked, broken, shelly and splayed hoofs.
5. Equalizing the disparity of toe-to-heel wall thickness.
6. Providing needed support in resectioning a broken hoof, with or without shoeing.
7. Combining with a heart bar shoe to give heart bar shoe support assistance to the coffin bone in treating laminitis and other circulator hoof problems, ring bone, navicular disease, fractures of bones of the hoof, and pedal osteitis.
8. Increasing wall and sole thickness.
9. Providing curative and preventive hoof treatment.

In addition, it is anticipated that the use of the hoof plate and the methods disclosed herein will provide the following benefits for the bovine industry:
1. Post-surgical stabilization of bovine claws in corn therapy.
2. Stabilization of bone fractures in the hoof.
3. Aid in therapeutic blocking techniques used in treating hooves.

Although galvanized metal is disclosed as preferred, other malleable and trimmable materials, such as aluminum or other metals and composites, could also be used.

A common method of treating laminitis, which has minimal success, is to support the horse's leg with a padded shoe or a heart bar shoe that includes a cross piece that supports the frog. It is thought that the heart bar shoe could beneficially be used in combination with the hoof plate of this invention to perhaps lessen the horse's pain and speed recovery.

In addition, epoxy may be used on a broken hoof with the hoof plate. Also, epoxy or some other plastic substance may be injected into the spaces between the hoof plate and the hoof, especially at the front to prevent egress of pebbles, dirt and other foreign matter.

While only a preferred embodiment has been described and shown, obvious modifications are contemplated within the scope of this invention, as contemplated by the following claims.

I claim:

1. A method of treating a hoofed animal that has laminitis in a hoof, which is characterized by a degeneration of the horny and sensitive laminae in the hoof that causes the coffin bone to drop and rotate within the hoof, resulting in lameness and inability to walk normally due to pain and debilitation of the animal, including the steps of:

providing a horseshoe, providing a flexible flat plate having apertures, wrapping the plate around at least a majority of the laminitic hoof, driving nails up through the hoof, out through apertures in the plate, and clinching the nail ends against the outer surface of the plate, screwing the plate to the hoof by inserting screws through apertures in the plate into the hoof wall, thus securing the plate to the hoof in a manner to constrict the outward flexing of the hoof when the hoof is loaded, constrict the normal outward growth of the hoof, and enable the horse to walk without pain, and leaving the plate in piece for a predetermined extended period of time to increase blood flow in the hoof capsule, thereby at least partially rehabilitating the animal by accelerating hoof growth and regeneration of the laminae.

2. The method of claim 1 wherein the period of time is approximately 12-16 weeks.

3. The method of claim 1, including the step of applying a plastic substance to at least a portion the void between the installed plate and hoof to prevent ingress of foreign matter 4. The method of claim 1, wherein the shoe is a heart bar shoe.

* * * * *